(12) United States Patent
Zaitsev (10) Patent No.: US 8,505,021 B2
(45) Date of Patent: Aug. 6, 2013

(54) EFFICIENT MANAGEMENT OF COMPUTER RESOURCES

(75) Inventor: Oleg V. Zaitsev, Smolensk (RU)

(73) Assignee: Kaspersky Lab ZAO, Moscow (RU)

( * ) Notice: Subject to any disclaimer, the term of this patent is extended or adjusted under 35 U.S.C. 154(b) by 196 days.

(21) Appl. No.: 13/220,189

(22) Filed: Aug. 29, 2011

(65) Prior Publication Data

US 2013/0055278 A1 Feb. 28, 2013

(51) Int. Cl.
*G06F 9/46* (2006.01)

(52) U.S. Cl.
USPC .......................................... 718/104; 718/102

(58) Field of Classification Search
None
See application file for complete search history.

(56) References Cited

U.S. PATENT DOCUMENTS

| | | | |
|---|---|---|---|
| 5,742,819 | A | 4/1998 | Caccavale et al. |
| 5,943,480 | A | 8/1999 | Neidhardt |
| 6,230,204 | B1 | 5/2001 | Fleming, III |
| 6,560,631 | B1 | 5/2003 | Ishihara et al. |
| 6,892,212 | B2 * | 5/2005 | Shuf et al. ............................. 1/1 |
| 7,028,298 | B1 * | 4/2006 | Foote ............................. 718/104 |
| 7,174,354 | B2 | 2/2007 | Andreasson |
| 7,424,589 | B1 | 9/2008 | Pliss et al. |
| 7,529,786 | B2 | 5/2009 | Andreasson |
| 2008/0172431 | A1 * | 7/2008 | Stephens et al. .............. 707/206 |
| 2009/0287846 | A1 | 11/2009 | Iyengar et al. |
| 2009/0319255 | A1 | 12/2009 | Vengerov |

FOREIGN PATENT DOCUMENTS

JP 61262949 11/1986

* cited by examiner

*Primary Examiner* — Emerson Puente
*Assistant Examiner* — Sisley Kim
(74) *Attorney, Agent, or Firm* — Patterson Thuente Pedersen, P.A.

(57) ABSTRACT

System, method, and computer-readable medium for managing removal of unused objects on a subject computer system that includes a plurality of computing resources. Current configuration and operational state information of a subject computer system are analyzed to detect a presence of unused objects on the subject computer system. An estimated degree of impact that unused objects have on the workload of at least one computing resource of the plurality of computing resources is obtained. A measure of the exigency of taking action to remove the unused objects is determined based on the estimated degree of impact and on the current degree of workload of the at least one computing resource. Instructions are generated for removing specific ones of the unused objects for which the exigency of taking action is sufficiently great.

20 Claims, 6 Drawing Sheets

EFFICIENT MANAGEMENT OF COMPUTER RESOURCES

FIELD OF THE INVENTION

The invention relates generally to information processing and, more particularly, to the efficient management of computer resources, including removal of unused objects on a computer system.

BACKGROUND OF THE INVENTION

The advancement of computing technology brings improvements in functionality, features, and usability of personal computers. Unfortunately, these benefits come with the cost of increased complexity in operating systems and other system software. One of the undesired consequences of increased system complexity is the introduction of inefficiencies in the use of computer resources. One example of such inefficiencies is the maintained presence of unused objects, i.e., data or programs, that occupy system resources such as memory or CPU cycles, and in some cases even reduce the computer system's overall performance.

Currently, the problem of managing such "garbage" objects in object-oriented programming languages such as Java, where the technology of garbage collection is built-in and the developer does not have to consider releasing allocated memory after the completion of the object. These technologies have worked out well, for example, in the virtual machine language of Java, Java Virtual Machine (JVM), however, these techniques cannot readily be deployed throughout a computer system reliably, since different computer systems have a variety of different hardware and software configurations outside of the developer's control.

In addition to the direct control of computer resources, an important task involves adapting the management process, which includes an assessment of various parameters. Currently this problem is addressed by running a cleaning task at an opportune moment, for example, as disclosed in U.S. Patent Application Pub. No. 2008/0172431, or by setting the parameters of the garbage collector, as disclosed in U.S. Patent Application Pub. No. 2009/0319255 and in U.S. Pat. No. 7,529,786. Another important task in improving the management of computer resources is assessing the criticality of unnecessary data in terms of impact on the computer system's operation. This problem is currently addressed to some extent by looking at the ratio of resources of the computer system and the amount of garbage on it. Similar mechanisms are described in Japanese Patent Publication No. JP61262949 and U.S. Pat. No. 7,174,354. To assess the degree of congestion of the computer one may also apply concepts such as checking the availability of a specific resource, such disclosed U.S. Pat. Nos. 6,230,204 and 5,943,480.

Although many approaches such as these for managing garbage objects have been proposed, they tend to be either very complex, or are targeted to a specific feature in garbage collection. Also, notably, the tasks associated with garbage collection are themselves difficult, i.e., computationally expensive; thus, running a garbage management process for the purpose of improving system performance, can itself constitute a load on the computer system that affects its performance. For these, and other reasons, a need remains for a simple, widely-deployable, holistic approach to managing garbage objects for the purpose of improving overall computer system performance.

SUMMARY OF THE INVENTION

One aspect of the invention is directed to a computer-implemented management system for managing removal of unused objects on a subject computer system. The subject computer system has a plurality of computing resources which may become burdened with a high degree of workload. In one embodiment, the management system comprises computer hardware, including at least one processor and input/output facilities communicatively coupled with the subject computer system. The computer hardware is programmed to implement a controller module which is adapted to detect a presence of unused objects on the subject computer system. Optionally, the detection of unused objects is initiated only after analysis of the current configuration and operational state information of the subject computer system reveals that a current degree of workload of the computing resources exceeds a workload threshold, which may be preset or dynamically adjustable based on the nature of use of the subject computer system.

Optionally, a categorization module is implemented on the computer hardware and operatively coupled with the controller module. When employed, the categorization module is adapted to associate the unused objects with a plurality of categories. The association can be accomplished by assigning the unused objects into categories, or can be based on previously-determined classifications.

An assessment module is implemented on the computer hardware and operatively coupled with the controller module. The assessment module is adapted to obtain an estimated degree of impact that the unused objects have on the workload of at least one computing resource and determine a measure of the exigency of taking action to remove the unused objects based on the estimated degree of impact and on the current degree of workload of the at least one computing resource.

An instruction module is implemented on the computer hardware and operatively coupled with the assessment module. The instruction module is adapted to generate instructions for removing specific ones of the unused objects in response to the measure of exigency of taking action meets or exceeds an exigency threshold.

In another aspect of the invention, a computer-implemented method for managing removal of unused objects on a subject computer system includes analyzing current configuration and operational state information of the subject computer system to detect a presence of unused objects on the subject computer system. An estimated degree of impact that unused objects have on the workload of at least one computing resource of the plurality of computing resources is obtained. The method further determines a measure of the exigency of taking action to remove the unused objects based on the estimated degree of impact and on the current degree of workload of the at least one computing resource, and generates instructions for removing specific ones of the unused objects in response to the measure of exigency of taking action meeting or exceeding an exigency threshold.

In another aspect of the invention, a computer-readable medium, such as a memory device or storage device, or combination thereof, includes instructions for carrying out the computer-implemented method.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the invention are directed to improving and, in some cases, optimizing, the use of computer resources such as memory and disk space, and in the process assisting the system administrator in carrying out preventive maintenance of a network's computers. Presently, any computer on a corporate network collects unused objects, also called garbage, such as: temporary files, various lists of the most recently executed transactions, reports, the contents of working memory of a process, kernel, or the whole operating system (dump), etc. Hereinafter, the terms unused objects and garbage are used interchangeably.

Typically, the operating system does not provide a standard means for the timely and effective removal of such garbage so that the performance of the computer system is minimally affected by the presence of the garbage.

In one aspect, embodiments of the invention are directed to the assessment of the workload of computer resources and determination of categories of objects that contribute most to the decrease in performance. In one embodiment, improving, or optimizing, of resource utilization is implemented as task that is run periodically.

In one type of embodiment, a controller initially collects information about the current operational state of the computer system. In one example, the initial data collection is performed by a locally-running process on the subject PC. For instance, a locally-installed security application or operating system process may perform this collection. In another embodiment, a specialized script execution module executes a data collection script that is retrieved from a remote computer, such as from a server.

In a related embodiment, the controller also assesses the degree of the system's workload. Embodiments of this type include various known methods of assessment to obtain information about the workload of key computer resources in corresponding units. For example, this information is available for the following resources and their corresponding exemplary measurable parameters:

Central processing unit (degree of workload, in percentages)

RAM (amount of used RAM, RAM read/write bandwidth, in MB/sec)

Hard drive (amount of used space; and/or disk read/write bandwidth, in Kbytes/sec)

Network (bandwidth of connections, Mbps)

In the simplest case, only one (most critical) critical parameter can be looked to as in indicator of the degree of utilization of each corresponding resource. In other embodiments, a plurality of different parameters may be used as indicators of resource utilization or workload. In one example, different parameters are given different weights based on their degrees of relative importance to the performance of the computer system.

Using one or more of the monitored parameters, the degree of the system workload is estimated. For example, to assess the workload of the hard drive one can use an indicator of the percentage of used storage space.

In a related embodiment, fuzzy logic may be used to provide an evaluation of the system. In one example, the system of fuzzy logic involves three stages: fuzzification, creating and using a fuzzy knowledge base, and defuzzification.

Fuzzification is the introduction of fuzziness into the analysis. To perform this operation linguistic variables are defined for all input variables, a term set is formed for each linguistic variable, and a membership function is defined for each term. For example, for the linguistic variable "degree of congestion of the hard disk" the term-set can have the form {"very low", "low", "medium", "high", "very high"}, which simplifies the analysis from having to reconcile various numerical values and incompatible units for different types of resources.

The fuzzy knowledge base includes production rules of the form "IF (premise of the rule), THEN (conclusion of the rule)". For example, the following rule can be used: "If the degree of congestion of the hard drive is high, then the degree of system load is high. The construction of such rules is usually straightforward, as they are easily understood and are a kind of "verbal coding". Defuzzification accomplishes obtaining a specific output value (e.g., numerical), which in this case is the estimate of the degree of computer resource utilization. The system of fuzzy logic accommodates a good degree of flexibility while taking into account many different characteristics of the system.

In one embodiment, a threshold is set for degree of system utilization, or workload. The threshold may be set to correspond to a level of system workload at which point the management of the workload is desired. For example, active management of workload may be desired at a point where the user notices some degree of sluggishness, or performance reduction. The threshold can be established for the user based on predetermined criteria, or may be set by the user herself through a user interface.

Application of the computer resource management technique according to embodiments of the invention can improve overall computer system performance. In some cases, the performance is optimized. As used herein, the term optimization of performance does not necessarily mean achieving the absolute best possible (i.e., fully maximized) performance, although in some circumstances maximum performance may be achieved. Instead, optimization of performance means achieving a performance level, the further improvement of which would provide an insubstantial effect from a practical standpoint, under the prevailing circumstances.

In another example, the workload threshold is set and varied based on the nature of the programs being run, and the user's corresponding sensitivity to reduced system performance (or a predetermined level of sensitivity corresponding to the programs being run). For instance, when a user is playing multimedia files, such as videos, or when the user is playing interactive games, even a relatively minor amount reduced system performance is much more noticeable and annoying to a user than other, less user-interactive activities, such as backing up files, rendering a still image, compiling a computer program, or working in a word processor or other business application. In one example case, additional parameters, such as the extent of use of user input devices, the extent of use of graphics processing and sound devices, and the like, may be monitored, and the threshold can be dynamically adjusted up or down based on a heavier weighting assigned to such parameters. In another example case, the system resource manager examines the process list and compares a knowledge base of popular programs (or their processes) against the most resource-intensive programs or processes currently running, and adjusts the threshold dynamically based on a pre-associated level of user sensitivity for each of the primary currently-running programs or processes.

In another embodiment, the system resource manager provides a user interface (such as a simple control accessible via the operating system GUI, e.g., the system tray in Microsoft Windows™ parlance), which the user can manipulate to request more or less aggressive management of garbage objects.

With the workload threshold being set at a point where system performance is noticeably degraded, if this threshold is not met or exceeded, no significant benefit would be achieved by active management of the garbage objects; thus, active management is not carried out and the process does not advance to that point. Thus, the task of optimizing the use of computer resources can be considered completed.

On the other hand, if the workload of one or more system resources meets or exceeds the set threshold, the system resource management process is permitted to advance to the next stage of analyzing the configuration and operational state of the computer resources. In one embodiment, the configuration information includes the hardware, system software, and application software that is installed on the computer system. The operational state information according to this embodiment is indicative of such operational information as the operating system components and device drivers and services are being used, the application programs which are running, the users who are logged-in, and the like. Based on the configuration and operational state information, unused objects may be detected and indentified. In a related embodiment, the configuration information (which changes much less frequently than the dynamic operational state information) is stored in a database or other suitable data structure, and is retrieved at a longer interval than the operational state information.

In a related embodiment, the unused objects are categorized (or have previously been categorized). Categories of managed objects include, but are not limited to the following categories:
   the files generated by a Web browser;
   the lists of the most recent operations/protocols;
   data stored as a result of a memory dump;
   processes;
   registry keys;
   network connections; and
   other data or program code not belonging to a current process.

In one type of embodiment, categorization of unused objects involves grouping, assigning, or otherwise associating together, the unused objects according to their type or according to a common property that relates to how the objects may be found, cleaned up, or otherwise managed. Such categorization can be particularly useful for this type of embodiment when there are similar management approaches for objects within each category, but different management approaches across the different categories.

Further aspects of the present invention estimate the current value of the impact of each of these categories on each of the key resources of the computer system. For example, the following set of impacts on certain ones of the key resources can be predetermined for the category of "temporary files":
   Impact on the bandwidth capacity of the disk—"Low";
   Impact on the volume of the used part of the disk—"Medium";
   Impact on RAM—a "Very Low";
   Impact on the CPU—is "very low", etc.

Similar sets of impacts on various ones of the key resources can be established for each of the other categories of objects managed by the system.

Then, based on the degree of utilization of computer resources, the computer system's parameters, and on the impact of a given category on the system's key resources, a measure of the exigency of removing garbage in this category is estimated. Removing garbage in this case means performing a set of actions aimed at removing unused objects.

In one embodiment, the measure of exigency of removing garbage of one or another category is defined using logical rules having the following form. For instance:
   IF the utilization of one of the key system resources is high AND the degree of impact of garbage category A for this resource is at least average, THEN the exigency of garbage removal in category A is above average.

In this example, the measure of the exigency determined based on the logical criteria is "above average." This measure is represented linguistically (i.e., using a system of fuzzy logic) in which other measures can be, for instance, "marginal," "below average," "medium," and "high." In another approach according to a related embodiment, the measure of exigency is represented numerically, e.g., as a value from 0 to 10, for instance. In various embodiments, the scale can be linear, or non-linear (e.g., exponential).

These rules may be stored in a database and refined on the basis of statistical data aggregation and analysis, or on expert system data. In the above example, a simplified rule is represented. In a more general embodiment, configuration parameters of the computer system, e.g., the read/write bandwidth of the hard drive, the level of disk fragmentation, disk type (platter vs. SSD), CPU frequency, the number of processor cores, operating system, operating system settings and so on, are also taken into account.

In another embodiment, the measure of removing a given category of objects is determined using a trained artificial neural network (ANN). To this end, observations are made on a set of at least one test computer, on which there are unused objects. Also, these test environments can be specially created. For selected test computers a number of performance indicators are identified, for example, the read/write bandwidth of the hard drive, the download speed of the operating system, application performance, time-averaged CPU utilization, and so on. After removal of the observed unused objects, the resulting value of the above parameters is compared with the initial values, thereby revealing the impact, if any, of the garbage removal on the computer performance. In training the ANN, the input variables include, for example, the settings on the computer, the degree of utilization of computer resources, and the impact of unused objects on key system resources. At the output of the ANN the value of the measure of exigency of removing unused objects is obtained. Once the ANN is trained, it will be able to automatically make decisions as to the exigency of garbage removal.

Over time, the estimated degree of impact of each category of key system resources may vary as computer hardware is constantly evolving and becoming more robust. For example, if hard disk utilization is over 80%, usually the read/write bandwidth presents a significant performance bottleneck in the system, which is associated with the seek time for moving the disk's armature across the tracks as the platter spins. In the case of solid-state drives this problem does not arise, since it has no moving parts, and data is read and written according to a different technological principle. In such situations, the use of parameter weighting is implemented in some embodiments. Thus, although the thresholds may be relatively constant, the assessment of the impact categories of accumulated garbage on the key resources of the computer is weighted. The weighting coefficients are stored in a database and updated periodically. In one particular embodiment, updating of the coefficients is carried out from a central server, which collects and analyzes data coming from multiple computers in the local area network.

Figure 1:
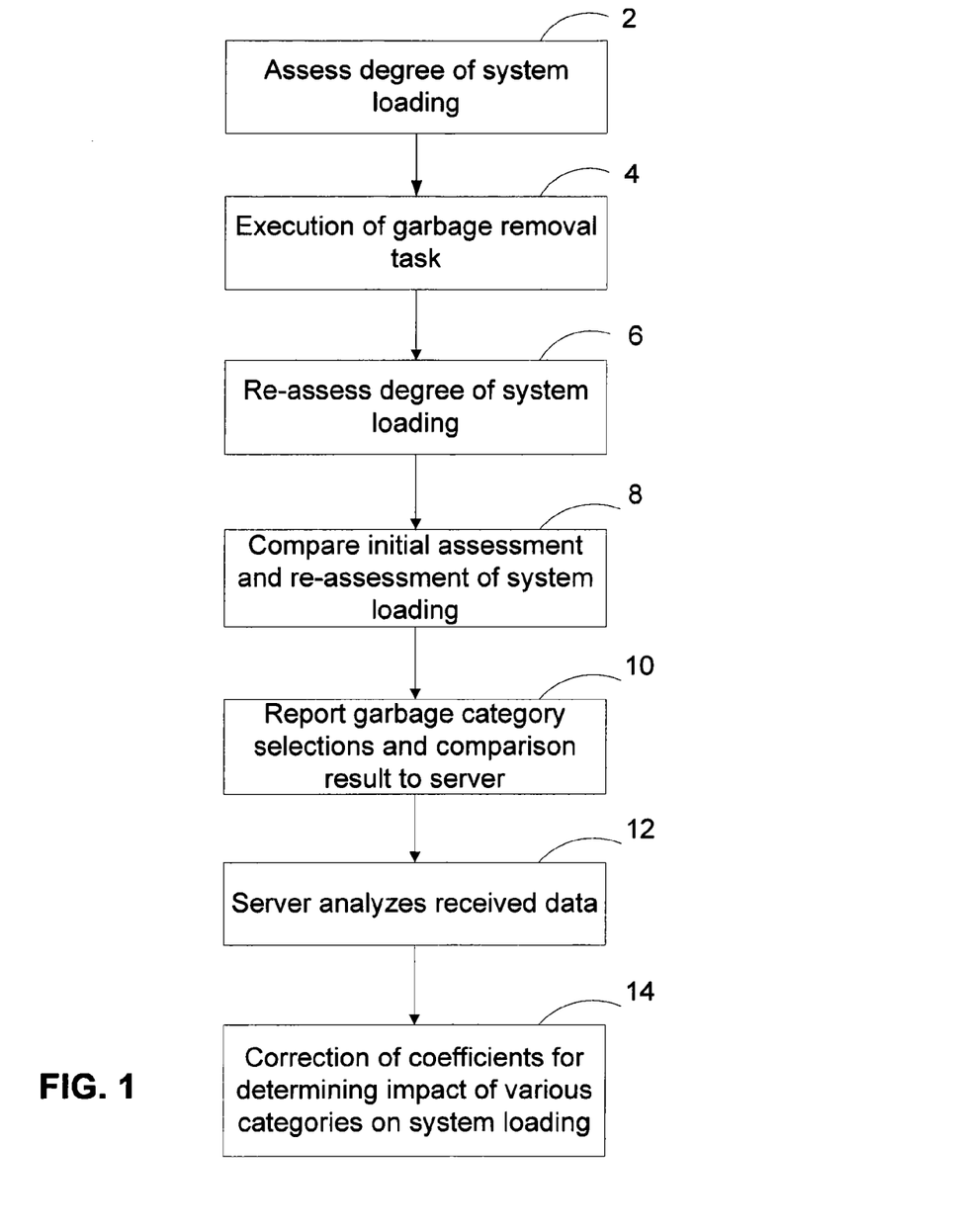
FIG. 1 is a flow diagram illustrating a method of updating weighting coefficients that are part of a feedback mechanism according on one embodiment of the invention.

In a related embodiment, the coefficients can be adjusted or refined by using a feedback arrangement, one example of which is illustrated in FIG. 1. At block 2, the initial degree of system loading is determined. At block 4, garbage removal is performed for selected categories. Thereafter, the system loading is re-assessed at 6 and, at 8, the result of the re-assessment is compared to the initial assessment of block 2. The comparison may reveal the following situations: cleaning has a high impact, medium impact, low impact, or nominal impact. In a related embodiment, fuzzy logic is used with the linguistic variable "degree of impact of garbage removal" and the term set of {"very low", "low", "medium", "high", "very high"}. Thereafter, information about the comparison result and garbage category selections is sent to a centralized server to at 10. The server analyzes this information at 12 and determines updated coefficient data for adjusting the thresholds. The analysis includes determining the category(ies) of garbage objects, the removal of which fails to improve system performance at or beyond a predetermined degree (e.g., by comparing the before-after system loading difference to a threshold value). Based on this, at 14, the coefficients are adjusted to reflect the impact of various categories of garbage objects on the workload of key resources.

In another embodiment, a ratio is considered between the general impact of removal of garbage objects on the performance of key system resources, and the amount of resources expended for conducting such removal. Based on this relationship, the coefficients may be modified. In one simple example, a set of production rules has the form "IF condition THEN action;" for instance, "If the degree of impact of cleaning is very low AND the amount of resources expended is HIGH, the values of the coefficients should be increased."

Thus, using the techniques described above, the exemplary embodiments address the problem of optimizing the utilization of the computer system as a whole. It should further be noted that the embodiments described herein are not limited to the personal computer in the usual sense. Persons of ordinary skill in the art will understand from this description that such a system for optimizing the use of resources can be implemented for stationary machines and a variety of mobile devices, and can also be extended to a local area network, or to a client-server model more generally.

Figure 2:
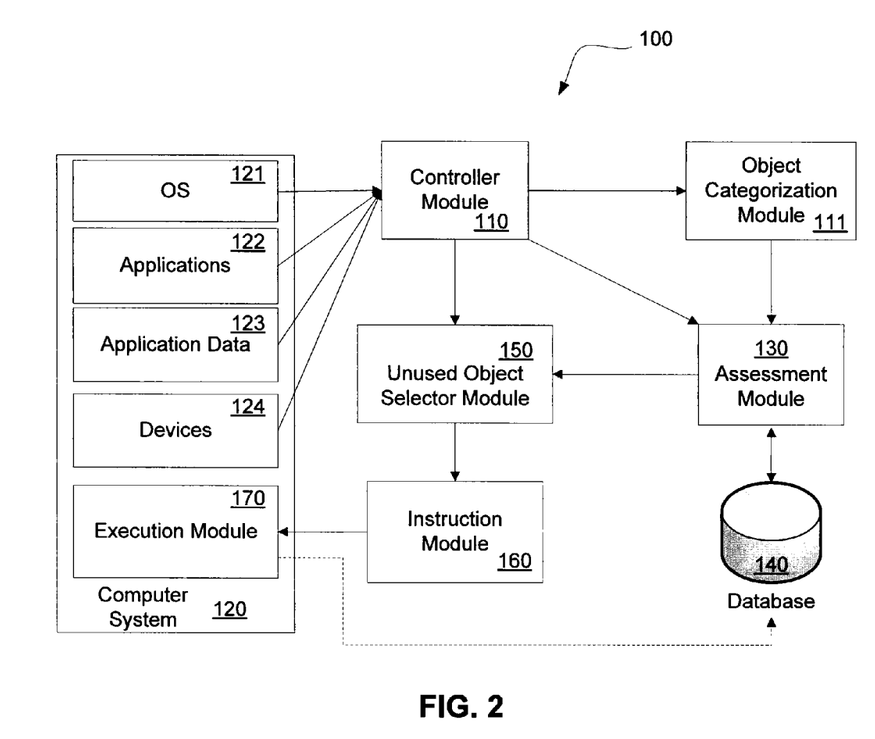
FIG. 2 is a block diagram illustrating interaction of the main components of a system for improving the use of computer resources according to one aspect of the invention.

FIG. 2 is a block diagram illustrating a computer-implemented system for managing the use of computer resources. The computer-implemented system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

Figure 5:
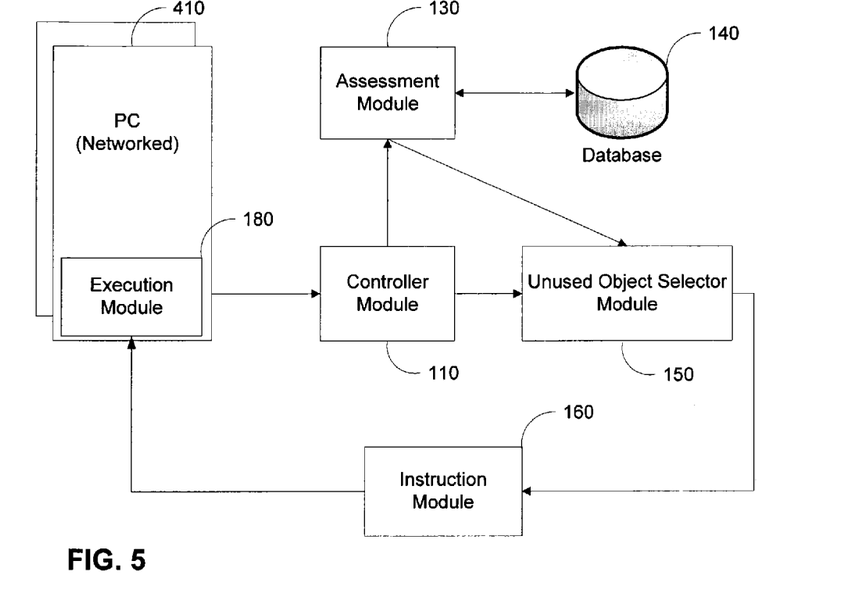
FIG. 5 is a schematic diagram illustrating a system according to one embodiment that is similar to the embodiment of FIG. 2, except that it is adapted specifically for application in a network configuration.

In the system of FIGS. 2 and 5, a plurality of modules interact with one another to carry out the system's functionality. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more general purpose computers (such as the one described in greater detail below) that execute an operating system, system programs, and application programs, while also implementing the module using multitasking, multithreading, distributed (e.g., cloud) processing, or other such techniques. Accordingly, each module can be realized in a variety of suitable configurations, and should not be limited to any particular implementation exemplified herein.

FIG. 2 is a block diagram illustrating system 100 for removing unused (i.e., garbage) objects according to one embodiment. The system includes controller module 110, object categorization module 111, assessment module 130, which accesses database 140 with the purpose of obtaining information about thresholds or other decision-making criteria, unused object selector module 150, instruction module 160 and execution module 170, which resides on computer system 120. Modules 110, 111, 130, 140, 150, and 160 of system 100 are operatively coupled with one another as illustrated. These modules may also reside on computer system 120, but in other embodiments may reside on a distinct at least one computer system. The input to system 100 is data from operating system 121, applications 122, application data 123, and devices 124 of computer system 120.

In the arrangement depicted, controller module 110 first collects configuration and operational state information of computer system 120, including the workload of various processes and storage. A search for unused objects is carried out using any suitable known method, for example, by analyzing the recently-used applications or processes, last date of use of certain objects associated with those (or other) applications or processes, the type of file, links or associations with other objects or processes, etc. A list of likely unused objects is gathered as a result of this process.

Based on this information, assessment module 130 makes a decision as to whether removal of the unused objects is appropriate. In a related embodiment, unused objects are identified at this stage. In an alternative embodiment, the specific unused objects are identified at a later stage.

In carrying out this evaluation, detected garbage objects in computer system 120 are categorized by object categorization module 111 according to one type of embodiment. For each selected category of objects, the estimated degree of its impact on key resources of the computer system is obtained, and then the measure of exigency for removal of each category is determined. In a particular embodiment, the degree of impact of each category of objects on key system resources is predefined in terms of fuzzy logic: an assigned linguistic variable, a term set for that variable, and the membership function. The measure of exigency of removal of the objects for each category is compared against a corresponding threshold value stored in database 140. This process is described in greater detail in FIG. 4 below.

The thresholds can be predetermined by assessment module 130 or by other means, such as, for example, using statistically-analyzed data collected and aggregated over a period of time. Alternatively, the threshold can be manually set by the user or an administrator. In one embodiment, a membership function is used to determine the degree of impact on the key categories of objects, taking into account an appropriate weighting factor, which is stored in database 140. The coefficients can be centrally updated, such as from a server.

If garbage clean-up for any category is indicated, unused object selector module 150 adds unused objects of that category to a list of objects to be deleted. At this stage a preliminary list of categories for which garbage removal may be called for is formed. Eventually, this list is refined by assessment module 130, for example, using heuristic methods.

After selecting one or more categories of objects, a list of unused objects within these categories is determined by unused object selector module 150. Object selector module 150 selects those unused objects from the total list compiled earlier, for which clean-up produces an impact which is higher than a predetermined threshold.

Based on the generated list of categories and objects, instruction module 160 generates instructions, such as scripts, for example, for removing unused objects. These instructions are provided to computer system 120, where they are subsequently executed by execution module 170.

Figure 3:
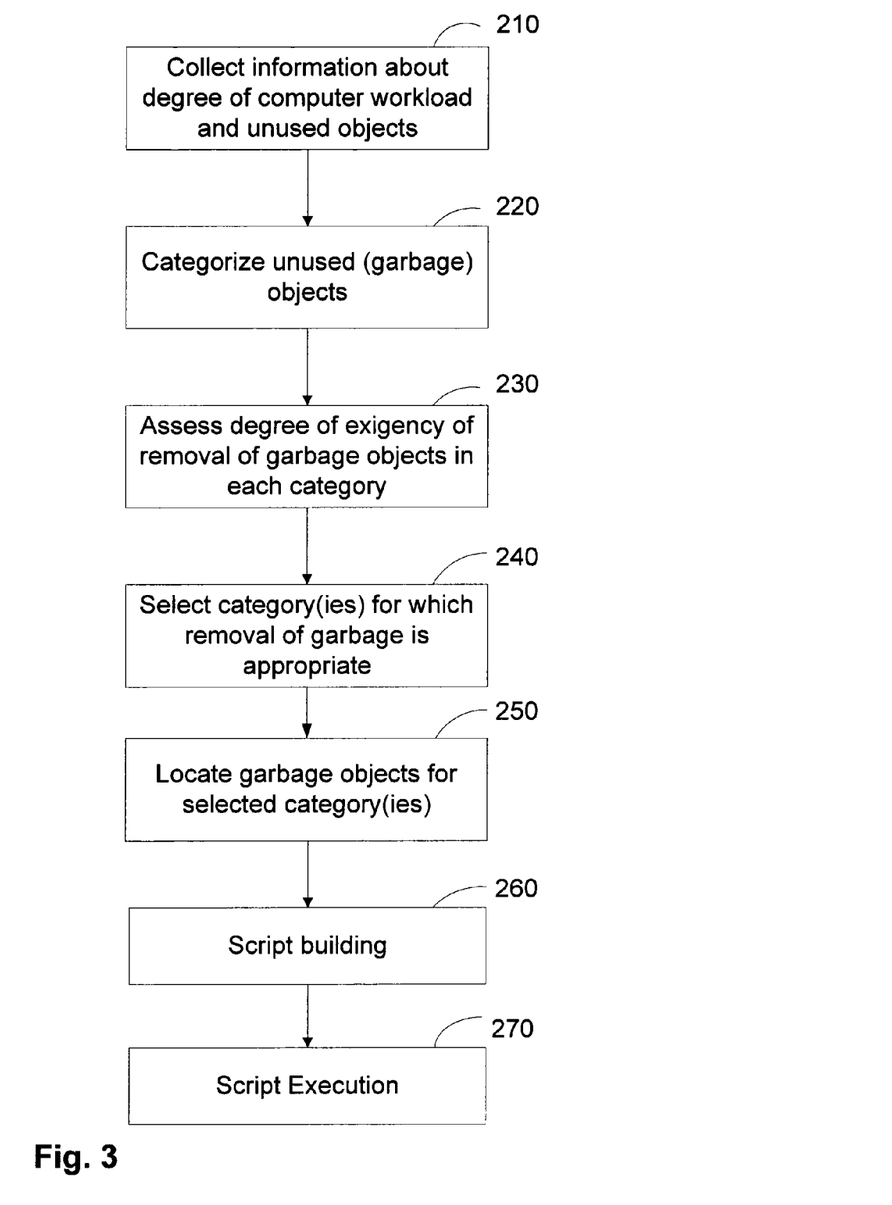
FIG. 3 is a diagram illustrating an exemplary process performed by the system of FIG. 2 according to one embodiment.

FIG. 3 illustrates an exemplary process flow related to the technique described above. At 210, controller module 110 collects information about unused objects, along with the workload burden of computer system 120. This information is passed to assessment module 130.

Using object categorization module 111, the unused objects are optionally categorized at block 220. This categorization can be accomplished using a suitable classification or clustering algorithm, for example. In one particular embodiment, the categorization can be based on specific rules, such as those relating to the location of an object or its life cycle relative to the life cycle of certain known processes.

In another embodiment, instead of performing a new categorization at 220, the categorization may be pre-established based on previously-defined associations between object type (or known objects) and an associated category. Thus, in this embodiment, block 220 simply looks up the predefined association.

At 230, using assessment module 130, the measure of exigency of garbage removal for each object or each category is assessed. This process is described below in greater detail in FIG. 4.

At 240, unused object selector module 150 generates a list of objects or categories for which objects must be removed by comparing measure of the exigency of garbage removal for each object or considered category with an associated exigency threshold, which is read from database 140. Only those objects or categories of objects for which the measure of exigency of garbage removal meets or exceeds the exigency threshold are marked for removal.

At 250, unused object selector module 150 searches for specific unused objects or unused objects within the selected categories that should be removed. The search for such garbage can be carried out in various ways, including employing artificial neural networks and heuristic methods.

In one embodiment that uses an artificial neural network (ANN) to identify unused objects, the ANN is initially trained using a training set of data. This takes into account not only the structure of objects, but also their location in the file system directory. Then, based on the training, the ANN is applied to make decisions as to the recognition of unused objects. In an embodiment using heuristic approaches, various templates corresponding to unused objects are applied to search for, and recognize, garbage to be removed.

When analysis is performed at a category level, the individualized unused objects need not be isolated and identified according to the ANN and heuristic approaches. Rather, entire categories of objects may be captured at once based on their category membership.

Next, at block 260, instructions, such as scripts, are formed by instruction module 160 to be executed on computer system 120 to remove the identified unused objects (or categories thereof). These instructions are executed at block 270 by execution module 170. After removal of the unused objects, information about the workload of computer system 120 is collected and stored in database 140 for logging or subsequent evaluation. Thus, at the user's request a full report, including an XML format, can be provided that details the detected and cleaned out garbage items.

In a related embodiment, prior to removal of identified garbage, a restore point is created, with copies (or archived copies) of the removed garbage stored elsewhere. For instance, objects removed from RAM can be stored on the hard drive; objects removed from the hard drive can be stored in off-site storage. With each stored restore point, a set of metadata includes all of the necessary information for restoring any removed objects, the removal of which caused unintended consequences.

Figure 4:
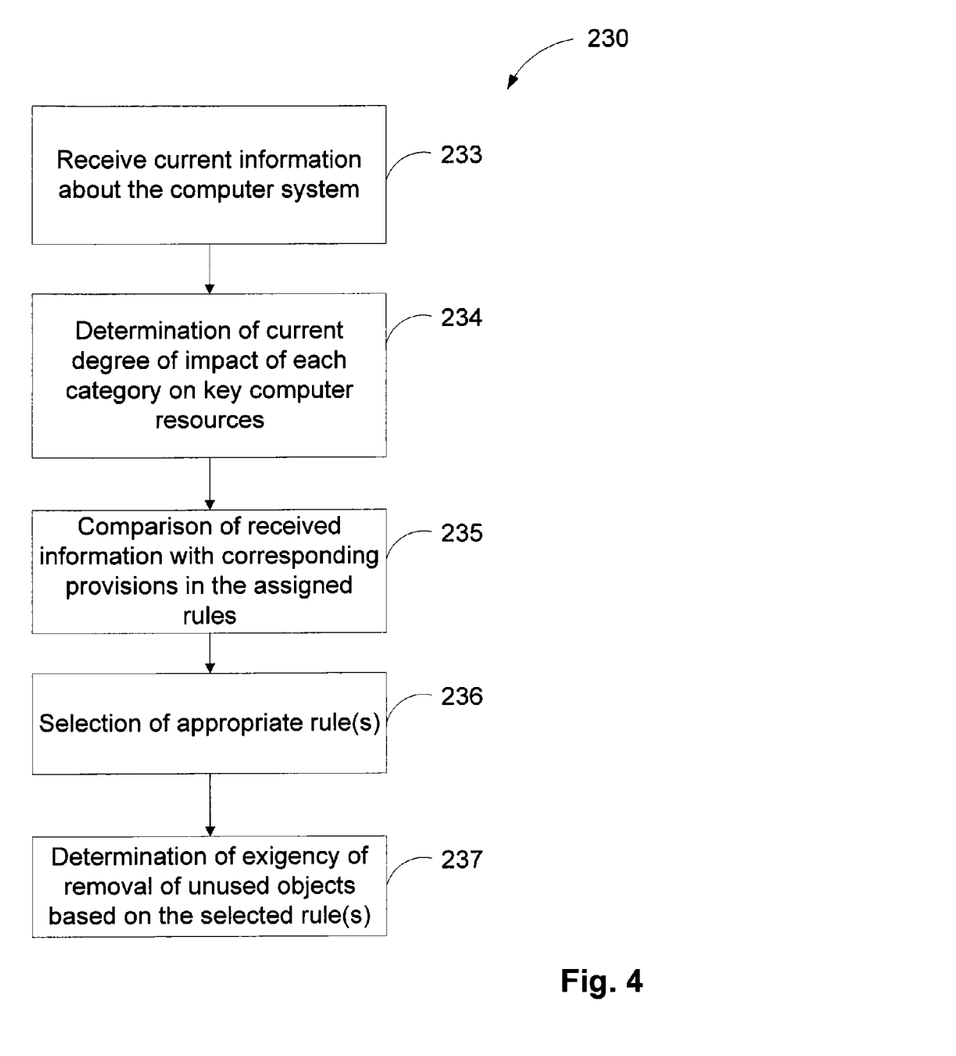
FIG. 4 illustrates a process of assessment of the measure of exigency of removal of garbage objects according to one embodiment.

FIG. 4 describes in greater detail the sequence of actions in block 230 to determine the categories of objects which are to be deleted according to one exemplary embodiment. In block 233, information is received from controller module 110 relating to the current values of the various monitored parameters of computer system 120. Information received at block 233 includes, for example, the ratio of unused objects relative to the amount of all objects that are on computer system 120.

Next, at 234, assessment module 130 determines the degree of impact the unused objects have on the key computer resources. In one particular embodiment the evaluation is performed on aggregated objects, such as at the category level, i.e., the impact that each category of unused objects has on the key computer resources. In a simplified implementation according to one embodiment, one key resource of the computer system, on which a corresponding category of unused objects has the greatest effect, is examined. For example, the category of temporary files is known to have a prominent effect on the space utilization of the disk or non-volatile storage device. Thus, the free space of the disk or non-volatile storage device is examined as the key resource which is an indicator of the effect produced by the temporary files category.

The degree of impact of categories of unused objects on key computer resources, as noted earlier, is evaluated in terms of fuzzy logic according to one type of embodiment. Evaluation can occur with the use of historical data, a pre-trained artificial neural network, expert data, or any combination thereof. Also, the degree of impact may be predetermined (e.g., a fixed value), and stored in database 140.

At block 235, the data obtained by controller module 110 and assessment module 130 are compared with corresponding criteria specified in the applicable rules. As an example form of such rules may include the following logic "IF the degree of congestion of the disk drive is high AND the degree of impact of temporary files on the level of loading is average, THEN the measure of exigency of removing temporary files is above average."

Next, in block 236 an appropriate rule is selected. If a rule is not defined for the prevailing combination of conditions or circumstances, then an appropriate rule can be selected based on a set of conditions or circumstances that are most similar to the prevailing ones. To select the closest conditions for which a rule is defined, a measure of proximity is employed. For example, assuming that the process performed thus far has determined the degree of congestion of the hard drive to be above average, and the extent to which temporary files impact the level of congestion is high. In this case, the following rules may be considered:

Rule A: "IF the degree of congestion of the hard drive is high AND the degree of impact of temporary files on the level of loading is at least average, THEN the measure of the exigency of removing temporary files is above average"

Rule B: "IF the degree of congestion of the hard disk medium AND the degree of impact of temporary files on the level of loading is below average, THEN the measure of the exigency of removing temporary files is medium."

In one approach, the distance between the conditions for each parameter is determined by a proximity measure, and these values are added. To determine the measure of the distance between the conditions, the various parameters can be quantified numerically based on their relative measures of degree, and the proximity of a prevailing condition to the provided-for conditions can be computed using a distance formula such as one based on the absolute value of the difference between the numerical values. A smaller distance value indicates a greater degree of similarity.

At block 237, the need for removing unused objects is determined based on the selected rule.

FIG. 5 illustrates an exemplary scheme for the use of certain embodiments that are adapted to a computer network setting. An exemplary system includes: one or more networked personal computers 410, controller module 110, assessment module 130, database 140, unused object selector module 150, instruction module 170, and execution module 180, which is implemented on networked PC 410. It is worth noting that some or all of these modules may be on the same local area network, or may be separated by one or more gateways (e.g., cloud computing model).

Controller module 110 is run periodically or continuously. In particular embodiments of the system, controller module 110 gathers information about unused objects and evaluates the workload of the entire network as a whole, or, alternatively, each individual computer 410 separately. Then the obtained workload data is sent to the assessment module 130, where the decision on the necessity of clean-up is made. In this example embodiment, categorization is not performed; however, in other embodiments utilizing categorization, the corresponding list of categories of objects are to be removed is formed at this stage.

The decision as to removal of garbage objects is made based on the information collected by controller module 110. This information includes resource utilization data on computers 410 of the network. Assessment module 130 produces a categorization of unused objects in computers 410. Alternatively, the categorization can be made in advance.

Next, the impact of each category of objects on key system resources is evaluated. Such an assessment can be carried using fuzzy logic techniques, or using expert system techniques, for example. The evaluation can also be carried out using statistical analysis or using an artificial neural network. Based on the information about the extent of the impact of each category on key system resources, and based on the present utilization of computer resources, the exigency of garbage removal is determined.

Unused object selector module 150 generates a list of categories of objects which are to be removed. This can be accomplished by comparing the exigency value of garbage removal for each category with relevant thresholds. Thresholds can be determined based on statistical data and stored in database 140.

The database itself can be implemented using well-known tools such as, for example, MySQL, MS Access, Dbase, MS SQL, SyBase, and the like, depending on the abilities and needs of the user. After the formation of this list of garbage objects, and the selection of objects for removal, instruction module 160 generates a specific instructions to be executed on execution module 170. In one embodiment, instruction forming module 160 can be implemented with any of the known shells, including a scripting language, for example, Bash, Microsoft PowerShell, or anti-virus utility AVZ. An example of a generated script using AVZ is as follows:

```
// Call the cleaning operation
Procedure RunSCU (AID: integer);
begin
ExecuteWizard ('SCU', 1, 1, false, AID);
end;
begin
RunSCU (3) // system logs
RunSCU (4) // memory dump
RunSCU (29) // memory dump (DrWatson)
RunSCU (7); // Temp
RunSCU (1928); // Temp (systemic)
RunSCU (8) // cache Adobe Flash Player
RunSCU (10) // cache QuickTime
RunSCU (13) // cache MacromediaFlash
RunSCU (14) // cache Java
RunSCU (16) // Protocols Windows Update
RunSCU (17) // Protocols Windows Update
RunSCU (25) // cache MS Office
end.
```

This script is transmitted to execution module 180 which runs it on the user's computer 410. In one particular embodiment, the transfer can be arranged over a secure channel or in encrypted form. Within the script a local procedure, or a remote procedure, can be called. After the call of the above procedure the removal of the selected objects takes place.

Figure 6:
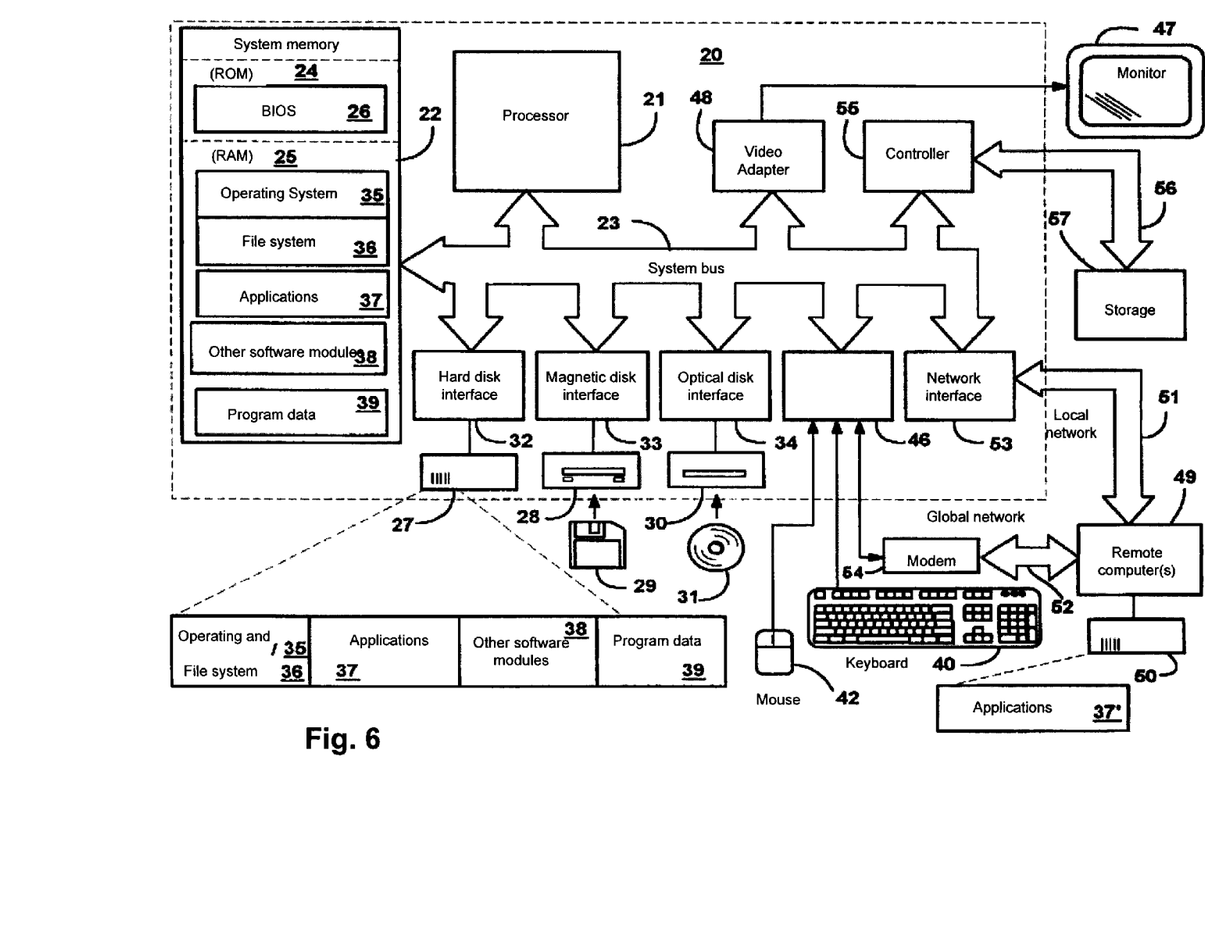
FIG. 6 is a block diagram illustrating an exemplary general-purpose computer on which aspects of the invention are deployed according to various embodiments.

FIG. 6 is an example of a general-purpose computer system on which the computer resource management system can be implemented. Personal computer or server 20 contains a CPU 21, system memory 22 and system bus 23, which contains various system components, including memory associated with CPU 21. The system bus 23 is implemented as any known in bus structure, including a bus memory, bus memory controller, peripheral bus and local bus, which can interact with any other bus architecture. System memory includes read only memory (ROM) 24, and random access memory (RAM) 25. Basic input/output system (BIOS), containing the main procedures that ensure the transfer of information between the elements of the personal computer 20, for example, at boot time using the ROM 24.

The personal computer 20 contains a hard drive 27 for reading and writing, magnetic disk drive 28 for reading and writing to removable magnetic disk 29 and an optical drive 30 for reading and writing to removable optical disk 31, such as CD-ROM, DVD-ROM or other optical media. The hard disk drive 27, magnetic disk drive 28, optical drive 30 are all connected to the system bus 23 via the hard disk interface 32, magnetic disk drive interface 33 and an optical drive interface 34, respectively. Drives and the corresponding computer storage media are non-volatile storage means of computer instructions, data structures, program modules and other data of a personal computer 20. This description reveals the implementation of a system, which uses a hard disk, removable magnetic disk 29 and a removable optical disk 31, but it should be understood that the use of other types of computer storage media that can store data in computer readable form (solid state disks, cassette tape, flash drive or other nonvolatile memory, digital disks, Bernoulli cartridges, random-access memory (RAM), read-only memories (ROM), etc.) is possible.

Some of the software modules, amongst which may be an operating system 35, are stored on a hard disk, magnetic disk 29, optical disk 31, ROM 24 or RAM 25. A computer 20 has a file system 36, which stores the operating system 35 and additional software applications 37, other program modules 38 and program data 39. The user has the ability to enter commands and information into a personal computer 20 through input devices (keyboard 40, Mouse 42). Other input devices may be (not shown): microphone, joystick, game console, satellite dish, scanner, etc. Such an input device are usually connected to the CPU 21 through a serial port 46, which in turn is connected to the system bus, but may be connected by other means, such as a parallel port, game port or universal serial bus (USB). A monitor 47 or other type of display device is also connected to the system bus 23 via an interface such as a video adapter 48. In addition to the monitor 47, personal computer can be equipped with other peripheral output devices (not shown), such as speakers and printer, etc.

A personal computer 20 can operate in a networked environment, using a logical connection to one or more remote computers 49. A remote computer (or computers) 49 is/are the same as personal computers, servers, routers, network stations, peering devices or another network node, and usually, have most or all of the elements previously described in the description of the substance of a personal computer 20, shown in FIG. 6, but only as a storage device 50 with applications 37. Logical connections include a local area network (LAN) 51 and wide area network (WAN) 52, such networks are common office equipment, and are also used in corporate computer networks, company intranets and the Internet.

When using LAN networks, a personal computer 20 is connected to LAN 51 via a network adapter or interface 53. When using the WAN networking, personal computer 20 has a modem 54 or other means of communication with the global computer network 52, such as the Internet. A modem 54, which may be internal or external, is connected to the system bus 23 via a serial port 46. In a networked environment software modules of exposed personal computers 20, or parts of such programs, are stored in remote storage devices. It should be pointed out that the network connections are merely illustrative and are not required to display the exact network configuration, network, i.e., in fact, there are other ways of establishing a logical connection, other technical means of communication of one computer to another.

It should be noted that aspects of the invention may be implemented using a computer system that is a subset of the general-purpose computer system described above. For instance, the computer system may be a blade server having a relatively limited set of input/output facilities. The computer system may also be implemented as an embedded system operating on a microcontroller digital signal processor, application-specific integrated circuit, field programmable gate array, or the like, provided that the system includes sufficient input/output facilities to enable it to interface with a subject computer system being managed or with other computing devices.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A computer-implemented management system for managing removal of unused objects on a subject computer system that includes a plurality of computing resources, the management system comprising:

computer hardware, including at least one processor and input/output facilities communicatively coupled with the subject computer system;

a controller module implemented on the computer hardware and adapted to analyze current configuration and operational state information of the subject computer system to detect a presence of unused objects on the subject computer system;

a categorization module implemented on the computer hardware and operatively coupled with the controller module, and adapted to associate unused objects with a plurality of categories, an assessment module implemented on the computer hardware and operatively coupled with the controller module, the assessment module being adapted to:

obtain, for each of the plurality of categories, an estimated degree of impact that unused objects have on a workload of the plurality of computing resources for each of the plurality of categories; and determine, for each of the plurality of categories, a measure of exigency of taking action to remove the unused objects based on the estimated degree of impact and on a current degree of workload of at least one computing resource of the plurality of computing resources, wherein the measure of exigency for each of the plurality of categories is determined based on at least one logical rule applying defined logical criteria; and an instruction module implemented on the computer hardware and operatively coupled with the assessment module, the instruction module being adapted to provide instructions for removing specific ones of the unused objects in response to the measure of exigency of taking action meeting or exceeding an exigency threshold.

2. The system of claim 1, wherein the controller module is further adapted to determine the current degree of workload of the at least one computing resource.

3. The system of claim 1, wherein the current operational state information is represented by a plurality of measurable parameters.

4. The system of claim 3, wherein the operational state information of at least one of the plurality of computing resources is represented by a single measurable parameter.

5. The system of claim 1, wherein the controller module is further adapted to analyze the current configuration and operational state information of the subject computer system to determine a current degree of workload value of each of the plurality of computing resources and to compare the current degree of workload value against a workload threshold; and wherein the controller module is further adapted to initiate detection of a presence of unused objects on the subject computer system only in response to a determination that the current degree of workload exceeds the workload threshold.

6. The system of claim 5, wherein the workload threshold is set at a level corresponding to a point at which performance of the subject computer system is noticeably degraded.

7. The system of claim 6, wherein the workload threshold is varied based on a nature of programs being run on the subject computer system.

8. The system of claim 1, wherein the management system is part of the subject computer system.

9. The system of claim 1, wherein the management system is located remotely from the subject computer system.

10. The system of claim 1, wherein the controller module is adapted to collect configuration information of the subject computer system.

11. The system of claim 10, wherein the assessment module is further adapted to determine the measure of exigency of taking action to remove the unused objects based on the configuration information.

12. The system of claim 1, wherein the estimated the degree of impact that unused objects have on each of the plurality of computing resources is predefined.

13. The system of claim 1, wherein the assessment module is further adapted to determine the measure of exigency of taking action to remove the unused objects based on a ratio of a general impact of management of unused objects on the performance of system resources, and an amount of resources expended for conducting the management.

14. The system of claim 1, further comprising an object selector module implemented on the computer hardware and operatively coupled with the controller module and the assessment module, the object selector module being adapted to identify the specific ones of the unused objects on the subject computer system to be removed based on the measure of exigency of taking action to remove the unused objects.

15. The system of claim 1, wherein the instructions for removing specific ones of the unused objects are provided in a script to be executed on the subject computer system.

16. A computer-implemented method for managing removal of unused objects on a subject computer system that includes a plurality of computing resources, the method comprising:

analyzing, by a computing system, current configuration and operational state information of the subject computer system to detect a presence of unused objects on the subject computer system;

associating, by a computing system, the unused objects with a plurality of categories;

obtaining, by a computing system, an estimated degree of impact that unused objects have on the workload of at least one computing resource of the plurality of computing resources for each of the plurality of categories;

determining, by a computing system, a measure of exigency of taking action to remove the unused objects based on the estimated degree of impact and on a degree of workload of the at least one computing resource for each of the plurality of categories, wherein the measure of exigency is determined based on at least one logical rule applying defined logical criteria; and generating instructions, by a computing system, for removing specific ones of the unused objects in response to the measure of exigency of taking action meeting or exceeding an exigency threshold.

17. The method of claim 16, further comprising: analyzing the current configuration and operational state information of the subject computer system to determine a current degree of workload value of each of the plurality of computing resources; and comparing the current degree of workload value against a workload threshold and permitting active management of unused objects only if the workload threshold is met or exceeded.

18. The method of claim 16, further comprising: collecting configuration information of the subject computer system; and determining the measure of exigency of taking action to remove the unused objects based on the configuration information.

19. The method of claim 16, wherein obtaining the estimated degree of impact that unused objects have on the workload of the at least one computing resource includes reading a predefined value of the estimated degree of impact.

20. A non-transitory computer-readable medium comprising instructions adapted to cause a computer system to:

analyze current configuration and operational state information of a subject computer system to detect a presence of unused objects on the subject computer system;

associate the unused objects with a plurality of categories;

obtain an estimated degree of impact that unused objects have on a workload of at least one computing resource of the plurality of computing resources for each of the plurality of categories;

determine a measure of exigency of taking action to remove the unused objects based on the estimated degree of impact and on a degree of workload of the at least one computing resource for each of the plurality of categories, wherein the measure of exigency is determined based on at least one logical rule applying defined logical criteria; and generate instructions for removing specific ones of the unused objects in response to the measure of exigency meeting or exceeding an exigency threshold.

* * * * *